US012663109B2

(12) United States Patent
Daniele et al.

(10) Patent No.: US 12,663,109 B2
(45) Date of Patent: Jun. 23, 2026

(54) DEVICE FOR CHECKING THE CORRECT CONNECTION OF HYDRAULIC LINES

(71) Applicant: Faster S.r.l., Rivolta d'Adda (IT)

(72) Inventors: Andrea Daniele, Reggio Nell'Emilia (IT); Riccardo Arrigoni, Rivolta d'Adda (IT)

( * ) Notice: Subject to any disclaimer, the term of this patent is extended or adjusted under 35 U.S.C. 154(b) by 0 days.

(21) Appl. No.: 19/117,042

(22) PCT Filed: Oct. 11, 2023

(86) PCT No.: PCT/IB2023/060218
§ 371 (c)(1),
(2) Date: Mar. 29, 2025

(87) PCT Pub. No.: WO2024/079651
PCT Pub. Date: Apr. 18, 2024

(65) Prior Publication Data
US 2026/0110378 A1 Apr. 23, 2026

(30) Foreign Application Priority Data
Oct. 13, 2022 (IT) ........................ 102022000021090

(51) Int. Cl.
F16L 37/00 (2006.01)
(52) U.S. Cl.
CPC ........... F16L 37/00 (2013.01); F16L 2201/10 (2013.01)
(58) Field of Classification Search
CPC .... H03K 17/97; G01D 5/2033; G01D 5/2013; G01D 5/2291; F16L 37/00; F16L 2201/10
See application file for complete search history.

(56) References Cited

U.S. PATENT DOCUMENTS

| | | | | |
|---|---|---|---|---|
| 11,274,778 | B2 * | 3/2022 | McMillan | ............... F16L 37/00 |
| 11,326,726 | B2 * | 5/2022 | Vega | ..................... G01M 15/02 |
| 11,773,880 | B2 * | 10/2023 | Vriends | ................... F16L 37/28 |
| | | | | 285/93 |
| 2003/0102664 | A1 * | 6/2003 | Novotny | ................. F16L 37/00 |
| | | | | 285/41 |
| 2008/0314642 | A1 * | 12/2008 | Rodney | ............... E21B 17/0285 |
| | | | | 175/57 |
| 2011/0018254 | A1 * | 1/2011 | Kuck | .................. F16L 37/0985 |
| | | | | 285/31 |
| 2011/0133759 | A1 * | 6/2011 | Chamberlin | ........ F16L 37/0985 |
| | | | | 324/685 |

(Continued)

FOREIGN PATENT DOCUMENTS

| | | |
|---|---|---|
| DE | 19917396 | 8/2000 |
| DE | 102008014255 | 1/2009 |

(Continued)

*Primary Examiner* — Aaron M Dunwoody

(74) *Attorney, Agent, or Firm* — Themis Law

(57) ABSTRACT

A device configured for checking that hydraulic lines are connected to each other correctly includes male and female quick-release couplings, of which the female quick-release coupling has a coil or solenoid winding with an electrical inductance. An electronic control unit is configured to supply current to the winding and to detect variations of the inductance value with respect to the variation of the position of the male quick-release coupling relative to the winding of the female quick-release coupling.

8 Claims, 2 Drawing Sheets

(56) References Cited

U.S. PATENT DOCUMENTS

| | | | | |
|---|---|---|---|---|
| 2013/0186669 | A1* | 7/2013 | Chabas | E21B 17/028 |
| | | | | 174/47 |
| 2013/0196524 | A1* | 8/2013 | Cecchinelli | H01R 13/64 |
| | | | | 439/191 |
| 2013/0345587 | A1* | 12/2013 | Colman | A61M 39/10 |
| | | | | 600/532 |
| 2014/0131998 | A1* | 5/2014 | Fraulin | F16L 37/098 |
| | | | | 285/317 |
| 2015/0177172 | A1* | 6/2015 | Upasani | F16L 11/086 |
| | | | | 324/693 |
| 2015/0192234 | A1* | 7/2015 | Fries | A61M 39/10 |
| | | | | 285/9.1 |
| 2015/0265828 | A1* | 9/2015 | Colman | F16L 21/00 |
| | | | | 604/535 |
| 2016/0230914 | A1* | 8/2016 | Roy | A61M 39/00 |
| 2017/0321825 | A1* | 11/2017 | Schuster | F16L 37/084 |
| 2018/0216759 | A1* | 8/2018 | Goodson | F16L 5/10 |
| 2018/0340556 | A1* | 11/2018 | Vriends | H04Q 9/00 |
| 2019/0022684 | A1* | 1/2019 | Bolea | F04B 49/065 |
| 2019/0024824 | A1* | 1/2019 | Bolea | H01B 7/282 |
| 2019/0145797 | A1 | 5/2019 | Daniels | |
| 2020/0190972 | A1* | 6/2020 | Sauthoff | F16L 15/001 |
| 2020/0191309 | A1* | 6/2020 | Mcmillan | F16L 25/01 |
| 2022/0290789 | A1* | 9/2022 | Mann | F16L 53/38 |

FOREIGN PATENT DOCUMENTS

| | | |
|---|---|---|
| DE | 102009032342 | 1/2011 |
| WO | 2022208258 | 10/2022 |

* cited by examiner

DEVICE FOR CHECKING THE CORRECT CONNECTION OF HYDRAULIC LINES

FIELD OF THE INVENTION

The present invention relates to a device for checking the correct connection of hydraulic lines, in particular for hydraulic applications, in which the connection is realized by means of a pair of quick-release couplings which are connected together.

In particular, the device for checking the correct connection of hydraulic lines according to the present invention allows to verify the correct connection between the male coupling provided on the hydraulic line pipe of the utility and the female coupling provided on the hydraulic system of the machine, signalling when the connection has been successful and when it has not.

BACKGROUND

It is known in the background art to connect hydraulic lines for hydraulic applications by means of quick-release couplings.

This is the case, in particular, with the connection of the hydraulic line of a utility with the hydraulic system of a machine, to which the utility must be operatively connected. In this type of connection, the hydraulic line on the user side is generally equipped with a male coupling, while on the machine side there is generally a female coupling, possibly inserted in a hydraulic block or plate in the case of multi-connection systems which allow the simultaneous connection of several hydraulic lines.

Currently, the control of the correct hydraulic/oleodynamic connection is purely mechanical, and is left exclusively to the subjective sensitivity of the operator, who visually checks the connection and tests it, assessing whether the two couplings, male and female, are firmly coupled.

However, such a situation has its drawbacks:

the check carried out by the operator is subject to discretion and error: the operator may not realize that the connection has not been made correctly, as may be the case when the incorrect coupling cannot be visually verified;

an accidental disconnection resulting from failure to detect an incorrect connection could cause more or less serious damage to machines or even to nearby operators.

Such drawbacks are perceived negatively by the user, who is not assisted in verifying the correct connection.

SUMMARY OF THE INVENTION

In light of the above, it is the task of the present invention to provide a device for checking the correct connection of hydraulic lines which allows to solve the drawbacks left unsolved by the background art.

An example of a device used to detect the correct connection of a hydraulic pipe is provided in US2011133759 A1, which describes an analogue coupling control system.

Within such a task, it is the object of the present invention to provide a device which allows to check the correct connection between the male coupling provided on the hydraulic line pipe of the utility and the female coupling provided on the hydraulic system of the machine.

Furthermore, it is the object of the present invention to provide a device for checking the correct connection of the couplings present on hydraulic lines which allows to electronically check the correct and successful connection of the hydraulic lines, confirming the successful connection to the operator with an appropriate signal;

signal a possible accidental disconnection, e.g., due to a malfunction of mechanical components, hydraulic overpressure or incorrect engagement between moving parts;

provide a check, e.g., an in-cab HMI control panel, on which the user can view all the correctly connected lines and all the disconnected or incorrectly connected lines;

process and receive statistics on the use of the hydraulic connection (number of connections), for possible predictive maintenance or commercial purposes.

The above task, as well as the objects mentioned and others that will become clearer below, are achieved by a device for checking the correct connection of hydraulic lines, according to the enclosed claim 1.

Other features of the device for checking the correct connection of hydraulic lines according to the present invention are set out in the dependent claims, which also form an integral part of the present description.

LIST OF FIGURES

Further features and advantages shall be more apparent from the description of a preferred, but not exclusive, embodiment of the device for checking the correct connection of hydraulic lines according to the present invention, illustrated merely by way of non-limiting example with the aid of the accompanying drawings, in which.

DETAILED DESCRIPTION OF THE INVENTION

Figure 1:
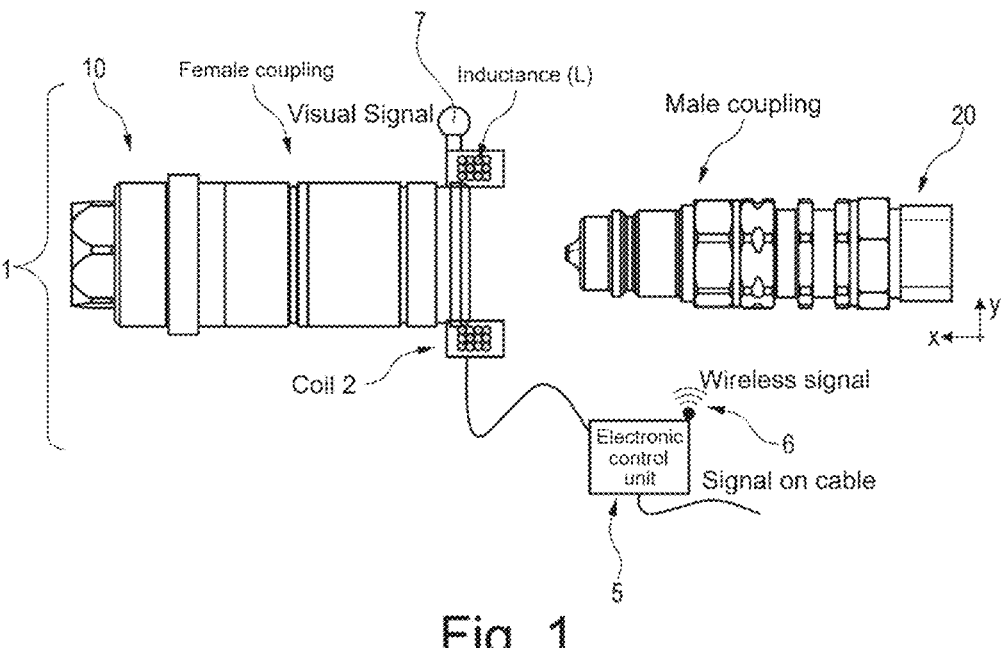
FIG. 1 shows a schematic overview of the female (left) and male (right) quick-release couplings which equip the hydraulic lines to be connected in a decoupled condition; on the female coupling, the components of the electromagnetic inductance system of the control device according to the present invention are schematically depicted.

With particular reference to the accompanying drawings, the control device 1 for checking the correct connection of hydraulic lines with which a male coupling 10 is associated, provided on the hydraulic line pipe of the utility, not shown, and the female coupling 20 normally provided on the hydraulic system of the machine, not shown, which can be either a single coupling or a multi-coupling hydraulic block or a fixed multi-coupling plate, is associated.

The operating principle of the control device 1 according to the present invention is based on the magnetic induction generated by the interaction between the metal material of which the male coupling 20 is formed, and the electromagnetic induction system equipping the female coupling 10 and advantageously comprising at least one coil or solenoid winding 2 having an electrical inductance L.

The control device 1 according to the present invention further comprises at least one electronic control unit 5 to which said electromagnetic induction system is connected.

Advantageously, said coil 2 comprises a copper winding preferably associated with the female coupling 10. Said coil or solenoid 2 is configured to receive an electric current from the electronic control unit 5, generating a magnetic field B which varies as the inductance L value of the winding varies, which remains constant as the current i flowing through the solenoid varies.

Taking care to make the male coupling 20 in a ferromagnetic material, the inductance L of the solenoid 2 will vary as the axial position of the male coupling 20 with respect to the solenoid 2 wrapping the female coupling 10 varies.

Since the value of the inductance L is proportional to the amount of ferromagnetic material present within the magnetic field generated within the solenoid 2 by the electric current i crossing it, as the position of the male coupling 20 varies along the direction X, coincident with the axial coupling direction of the two couplings 10, 20, the inductance L varies, and a different value of the inductance L can be associated with a different axial position of the male coupling 20 with respect to the female coupling 10. The different inductance value L is advantageously detected by the same electronic control unit 5 of the device.

Therefore, the control device 1 according to the present invention does not only allow to detect whether the male coupling 20 is inserted inside the female coupling 10, but rather allows to associate a certain inductance value L with each precise axial position (along the axis X) of the male coupling 20 with respect to the female coupling 10; associating the position of the male coupling 20 correctly connected to the female coupling 10 (inserted therein) a certain target inductance value $L_c$ of the solenoid 2 corresponding to the position of the male coupling 20 in the condition CC of successful connection, and by storing this value in a memory unit of the control unit, the control unit 5 will be able to detect the condition CC of successful connection between the couplings 10, 20 of the hydraulic line when it detects such an inductance value $L_c$.

All the inductance values other than the target value $L_c$ will correspond to a condition NC of incorrect connection, and the control unit 5 may consequently signal the incorrect connection with an acoustic signal and/or by means of a visual indicator 7, e.g., by turning on a red LED light of said visual indicator 7.

If the control unit 5 detects an inductance value $L=L_c$ corresponding to the target value which signals the condition CC of successful connection, such a condition may be signalled advantageously by means of an acoustic signal again and/or by means of a visual indicator 7, for example by turning one LED light of said visual indicator 7 green.

Thereby, the control device 1 according to the present invention allows to detect voluntary or accidental conditions of NC disconnection.

The confirmation of a successful connection is therefore linked to an analysis of the response signal from the solenoid 2 read by the microcontroller of the electronic control unit 5.

Figure 2:
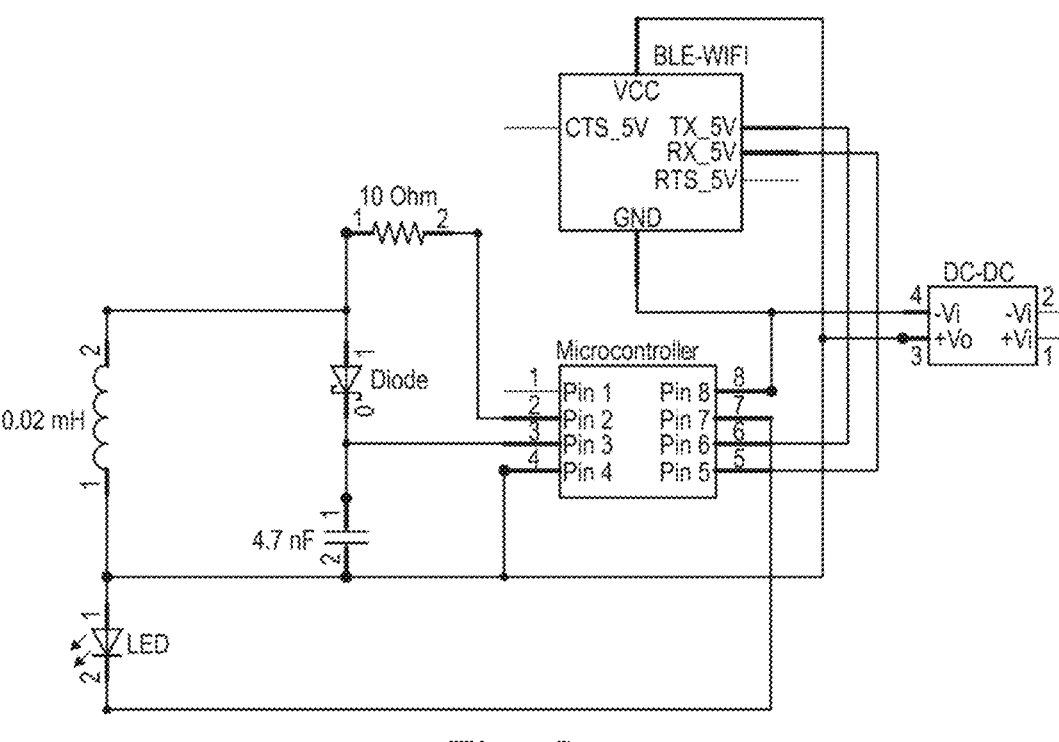
FIG. 2 shows an electrical diagram of the device for checking the correct connection of hydraulic lines according to the present invention.

With particular reference to FIG. 2, which illustrates the circuit diagram of the device according to the present invention, the variable inductance value L is read as a voltage value stored by the RLC circuit in a given time period.

Such a value is discretized by the ADC (analogue-to-digital converter) system integrated in the microcontroller, in $2^n$ bits.

Therefore, a range of the signal is advantageously defined, from a maximum value (at the condition NC of coupling non-connection), to a minimum value (at the condition CC of successful coupling connection).

In this set of values, the target value $L_c$ is advantageously identified as a percentage limit from the minimum value, corresponding to the correct connection CC of the male coupling in the female coupling.

Figure 3:
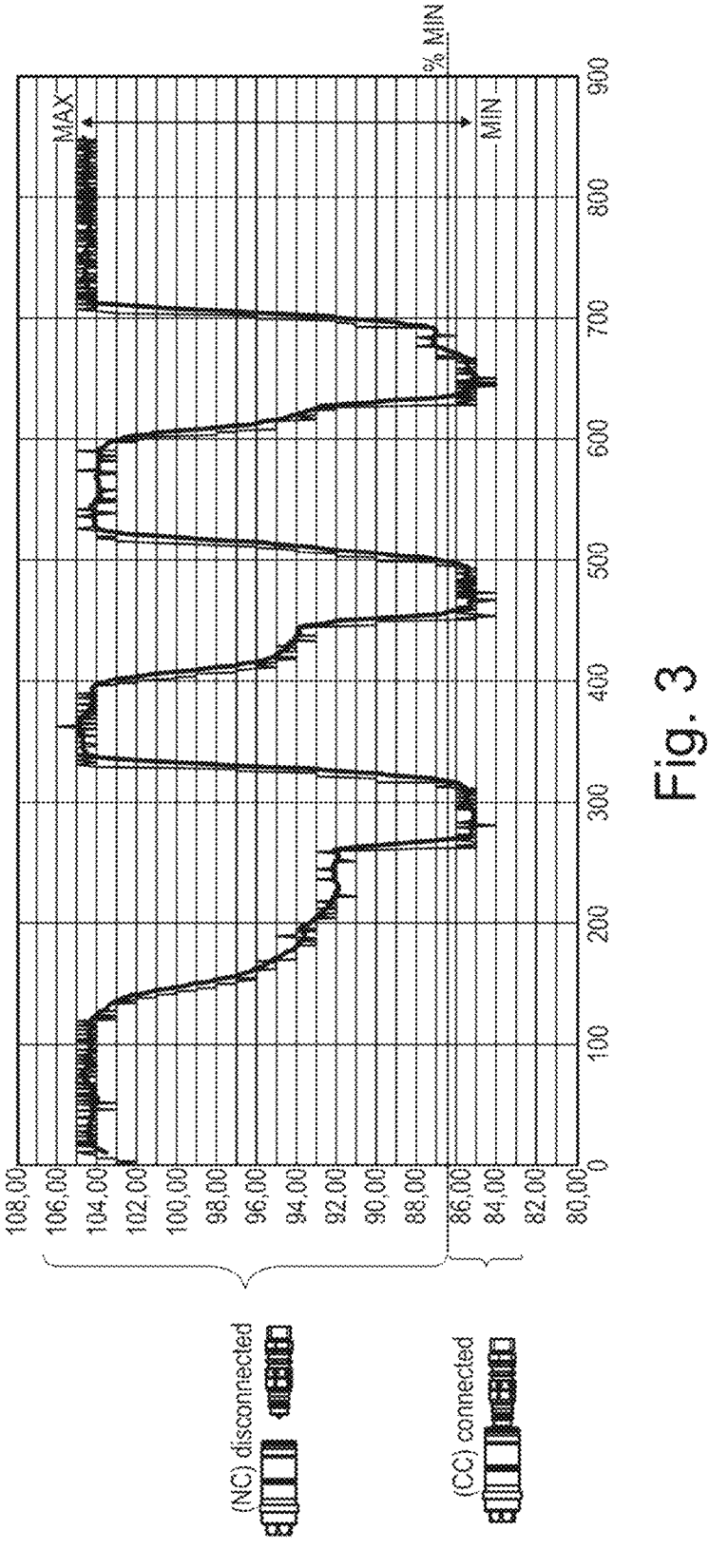
FIG. 3 shows a graph representing the signal detected by the control device according to the present invention.

The situation is depicted in the graph in FIG. 3.

In the connection step, such a value must be maintained for a certain number of checks carried out by the microcontroller before determining a correct connection.

During the correct connection, the microcontroller of the control unit 5 activates a peripheral device used to recognize the connection status, such as advantageously a wireless module 6 (Bluetooth, wifi, LoRa), a light signal 7, a signal on HMI and the like.

Advantageously, said electronic control unit 5 further comprises at least one Bluetooth, BLE (Bluetooth Low Energy) or WiFi communication electronic element, at least one DC/DC converter board and the electronics for the RLC circuit.

Said electronic control unit 5 is advantageously connected electrically to the line (12V or 24V DC) of the machine, and is configured to output a signal on an RLC circuit and process the circuit's response according to the inductance value of the winding.

It has thus been shown how a control device for checking the correct connection of hydraulic lines according to the present invention achieves the intended task and objects.

In particular, it was shown how the control device according to the present invention allows to check the correct connection of hydraulic lines provided with quick-release couplings by electronically checking the correct connection of the hydraulic lines, confirming the successful connection to the operator by means of an appropriate signal.

Furthermore, it was shown how the control device according to the present invention allows to signal a possible accidental disconnection, e.g., due to a malfunction of mechanical components, hydraulic overpressure or incorrect engagement between moving parts, Furthermore, the device can process and receive statistics on the use of the hydraulic connection (number of connections), for possible predictive maintenance or commercial purposes.

The present invention has been described by way of a non-limiting illustrative example according to preferred embodiments, however, it is understood that variations and/ or modifications may be made by those skilled in the art, without thereby departing from the relative scope of protection, as defined in the attached claims.

The invention claimed is:

1. A control device for checking a correct connection of hydraulic lines, wherein the connection is achieved using male quick-release couplings and female quick-release couplings, the control device comprising:

a female coupling and a male coupling configured for being inserted into said female coupling, said male coupling being at least in part made of a ferromagnetic material and said female coupling comprising a winding configured as a coil or solenoid winding having an electrical inductance; and an electronic control unit configured for supplying current to said winding and for detecting variations of an inductance value as a position of said male coupling changes relative to said winding of said female coupling, wherein said electronic control unit comprises a memory unit, in which a target inductance value corresponding to the position of the male coupling in a condition of successful connection is stored in advance, and wherein said electronic control unit is adapted to make a comparison between the detected inductance value and the target inductance value corresponding to the position of the male coupling in the condition of successful connection, emitting a successful connection signal when the detected inductance value equals the target inductance value.

2. The control device according to claim 1, wherein said target inductance value is identified as a percentage limit from a minimum value, corresponding to the condition of successful connection.

3. The control device according to claim 2, wherein, given X as an axial direction of coupling of the male and the female couplings, the inductance value varies as the position of the male coupling varies along the axial direction X.

4. The control device according to claim 1, wherein said electronic control unit is configured to emit the successful connection signal and a different signal corresponding to a condition of disconnection.

5. The control device according to claim 1, further comprising a visual indicator configured to emit a visual signal when the visual indicator receives the successful connection signal emitted by the electronic control unit, and to emit a different visual signal when the visual indicator receives a signal corresponding to a condition of non-connection.

6. The control device according to claim 1, wherein said electronic control unit comprises an RLC circuit, a micro-controller and, integrated in said microcontroller, an analogue-to-digital converter, the inductance value of the winding, which is variable as a function of the position of the male coupling with respect to the winding which equips the female coupling, being read as a voltage value stored by the RLC circuit in a given period of time and being discretized by the analogue-to-digital converter, so as to define a signal range variable between a maximum value corresponding to a condition of not connected coupling and a minimum value corresponding to the condition of successful connection.

7. The control device according to claim 1, wherein said electronic control unit (5) further comprises at least one Bluetooth, BLE (Bluetooth Low Energy), or WiFi electronic communication element.

8. The control device according to claim 6, wherein said microcontroller of said electronic control unit is configured to repeatedly read the inductance value returned by the RLC circuit and to output a signal corresponding to the successful connection condition only when the detected inductance value matches the target value in a plurality of readings.

\* \* \* \* \*